No. 642,507. Patented Jan. 30, 1900.
W. TOPPING.
ROASTING PAN.
(Application filed Feb. 6, 1899.)
(No Model.)
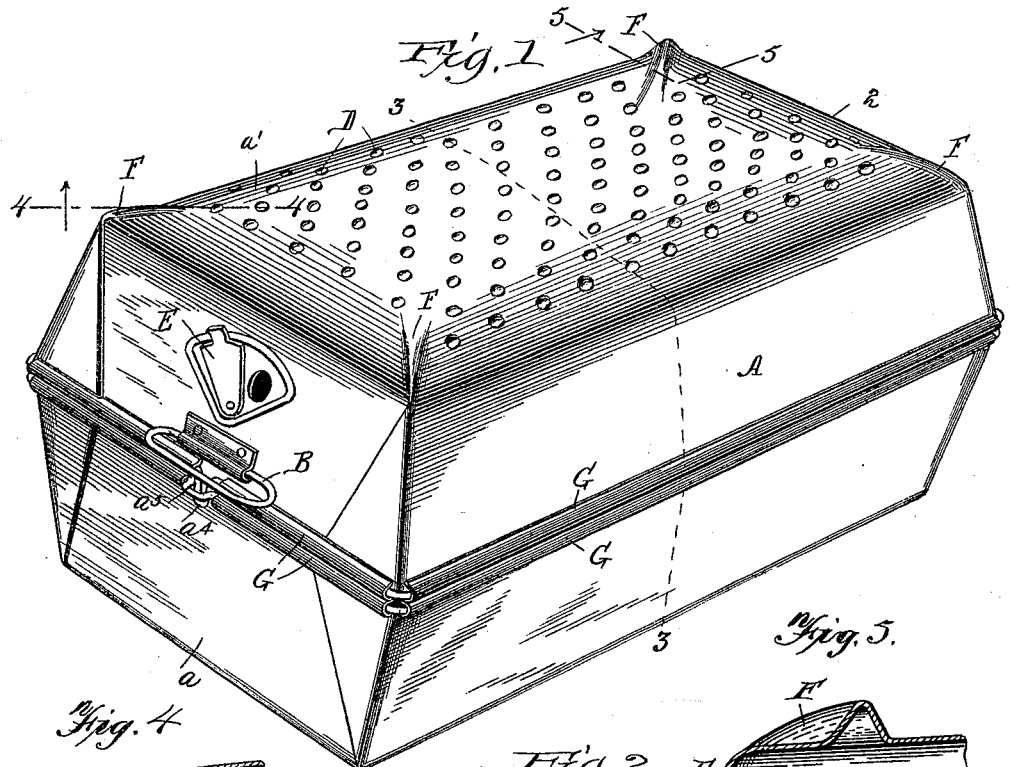
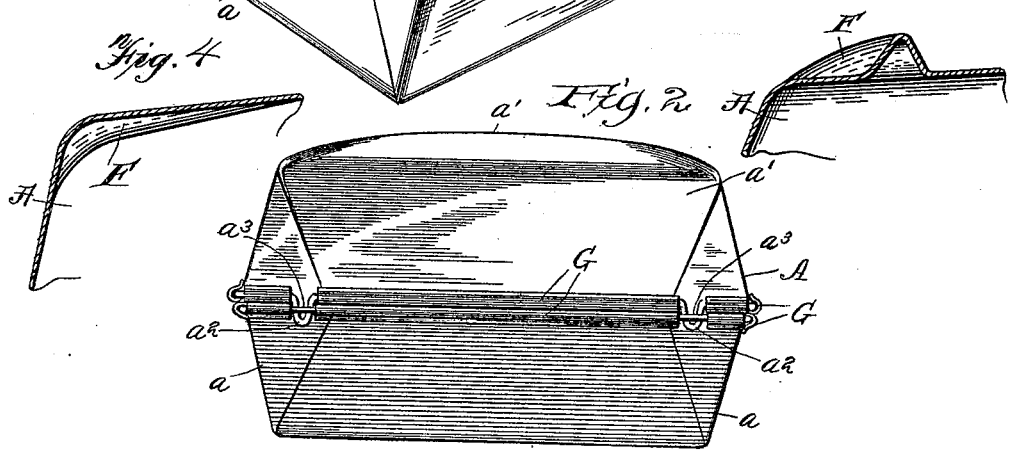
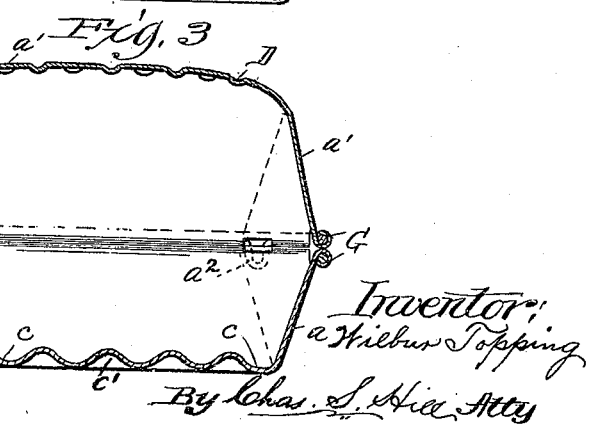
Witnesses:
Inventor:
Wilbur Topping
By Chas. L. Hia Atty

UNITED STATES PATENT OFFICE.

WILBUR TOPPING, OF HARVEY, ILLINOIS.

ROASTING-PAN.

SPECIFICATION forming part of Letters Patent No. 642,507, dated January 30, 1900.

Application filed February 6, 1899. Serial No. 704,749. (No model.)

*To all whom it may concern:*

Be it known that I, WILBUR TOPPING, a citizen of the United States of America, residing at Harvey, in the county of Cook and State of Illinois, have invented a certain new and useful Improvement in Roasting-Pans, of which the following is a specification.

Referring to the accompanying drawings, wherein like reference-letters indicate the same or corresponding parts, Figure 1 is a perspective showing my novel roasting-pan. Fig. 2 is a view of the end 2 of my invention. Fig. 3 is a vertical transverse section of my invention, taken on the line 3 3 of Fig. 1. Fig. 4 is a sectional view taken on the line 4 4 of Fig. 1. Fig. 5 is a sectional view taken on the line 5 5 of Fig. 1.

The object of my invention is to remedy the defects existing in roasting-pans now known to the art; and to that end it consists in the features of construction and combination hereinafter to be more particularly described, and set forth in the claims hereto annexed.

In the drawings, A is my novel roasting-pan formed in two parts, a lower pan $a$ and an inverted upper pan or top $a'$, both constructed of sheet metal. The pans $a$ and $a'$ have the edges of their open ends bent over to form the lips G, through which wires are passed to brace the edges and to form the loops $a^2$ $a^3$ $a^4$ $a^5$, the loops $a^2$ $a^5$ being respectively adapted to engage the loops $a^3$ $a^4$ and when engaging said loops to hold the two pans in the position shown in Fig. 1. The loops $a^2$ are removably inserted within the loops $a^3$ and act conjointly therewith to form hinges when the upper pan $a'$ is thrown upward and backward, which may be done by means of the bail B, and the loop $a^4$ removably passes through the loop $a^5$ and may there be retained by any suitable means, thus securing the two pans together, so that the pan A may be carried as a whole by means of the bail B.

When the position of the two pans is that shown in the drawings and it is desired to place meat therein, the upper pan is raised or thrown back or entirely removed from the lower pan. The meat is then inserted within the lower pan, so that it rests upon the ridges C. Water is then poured into the lower pan to fill or partially fill the indentations $c$, after which the two pans are placed together or are permitted to come together in the position indicated in the drawings and may be fastened in such position, if desired, and the whole is then ready to be placed within the oven.

During the process of cooking the operation of the device is as follows: The water placed in the bottom of the pan gradually rises in temperature by its contact with the hot metal bottom until, reaching the boiling-point, it is turned into steam. The steam thus formed ascends to the dome-shaped top of the upper pan, where it condenses and collects upon the protuberances D, whence it is precipitated upon the meat, and collecting again in the bottom of the lower pan the operation is repeated so long as there be sufficient heat to evaporate the water or until the pan is removed from the oven and allowed to cool, the pan thus acting as a self-baster. The grooves formed at the inner side of the corners of the dome-shaped top and which extend inward serve an important function in collecting and directing the rising vapor to the center of the top over the article being cooked, and hence to the protuberances D, which serve to collect and condense the vapor, as described.

It will be seen that immediately below the ridges C are indentations $c'$, which act as hot-air chambers and increase the heating-surface of the pan.

A ventilator or ventilators E may be positioned at any desirable point or points to control the admission of air for the purpose of regulating the temperature within the pan. The two pans $a$ $a'$ may be permanently attached to each other by means of hinges instead of the loops $a^2$ $a^3$, hereinbefore described, and these loops or their equivalents and the loops $a^4$ $a^5$ or their equivalents may be of any desired number and placed upon the sides of the pans instead of on the ends, as shown in the drawings.

It is obvious that there may be more than one bail, the same being positioned at any desired points, and it is further obvious that the protuberances D and the ridges C may be of any number and of any size.

Heretofore rectangular roasting-pans when formed with a dome-shaped top have been required to be made of stamped metal, as otherwise an excess of metal existed, rendering the dome unsightly and irregular. To dispense with these objections, I gather together at the four corners of the top of the pan the excess metal occasioned by the doming of the top into ridges F, which form at the inner side of the dome inwardly-extending grooves. Not only does the gathering of the metal in this manner improve the appearance of the top of the pan, but it greatly increases the effectiveness of the same in collecting the vapor and directing it toward the center of the pan, from which point it will be precipitated upon the meat to the best advantage, and this gathering of the excess metal in the manner described forms the essential feature of my invention. Without the grooves formed by said ridges the vapor would condense at the four corners and be precipitated down the sides to the lower pan without coming in contact with the meat which it is intended to baste.

Having thus described my invention, what I claim as new, and desire to secure by Letters Patent, is—

1. A cooking utensil formed of sheet metal and composed of two parts, an upper and a lower pan, the upper pan having a dome-shaped top provided with vapor-gathering grooves F and protuberances D in the inner side thereof, substantially as and for the purpose described.

2. A cover for cooking utensils formed of sheet metal, the sides thereof provided with vertically-arranged seams at its corners and having a bulged dome-shaped top, the dome-shaped top having at its inner side vapor-gathering grooves beginning at the upper ends of said vertically-arranged seams and extending in a direction toward the center of the top, substantially as described.

3. A rectangular cover for cooking utensils having at the inner side vapor-gathering grooves, the outer ends of said grooves beginning at the corners of the cover, and extending diagonally inward toward the center of the top and ending and vanishing at points intermediate the sides of said top, substantially as described.

WILBUR TOPPING.

Witnesses:
CHARLES S. HILL,
L. A. GARDINER.